United States Patent
Samid

(10) Patent No.: US 10,523,642 B2
(45) Date of Patent: Dec. 31, 2019

(54) SKELETON NETWORK: PHYSICAL CORNER STONE FOR THE TOWERING CYBER HOUSE

(71) Applicant: Gideon Samid, Rockville, MD (US)

(72) Inventor: Gideon Samid, Rockville, MD (US)

(*) Notice: Subject to any disclaimer, the term of this patent is extended or adjusted under 35 U.S.C. 154(b) by 0 days.

(21) Appl. No.: 16/444,892

(22) Filed: Jun. 18, 2019

(65) Prior Publication Data

US 2019/0327219 A1 Oct. 24, 2019

Related U.S. Application Data

(63) Continuation-in-part of application No. 15/293,352, filed on Oct. 14, 2016.

(60) Provisional application No. 62/688,387, filed on Jun. 22, 2018, provisional application No. 62/689,890, filed on Jun. 26, 2018, provisional application No. 62/714,735, filed on Aug. 5, 2018, provisional application No. 62/805,369, filed on Feb. 14, 2019, provisional application No. 62/813,281, filed on Mar. 4, 2019, provisional application No. 62/782,301, filed on Dec. 19, 2018, provisional application No. 62/850,720, filed on May 21, 2019, provisional application No. 62/857,898, filed on Jun. 6, 2019.

(51) Int. Cl.
*H04L 29/06* (2006.01)
*H04L 9/08* (2006.01)

(52) U.S. Cl.
CPC ........ *H04L 63/0471* (2013.01); *H04L 9/0891* (2013.01)

(58) Field of Classification Search
CPC .................................................. H04L 63/0471
See application file for complete search history.

(56) References Cited

U.S. PATENT DOCUMENTS 9,720,700 B1 * 8/2017 Brown ................... H04L 9/0891
2012/0246463 A1 * 9/2012 Shea ...................... H04L 63/061
713/153

OTHER PUBLICATIONS

Ahmad et al.; An information-centric approach to data security in organizations; Published in: TENCON 2005-2005 IEEE Region 10 Conference; Date of Conference: Nov. 21-24, 2005; IEEE Xplore: (Year: 2005).*
Choi et al.; Secure mutual proximity zone enclosure evaluation; Proceeding SIGSPATIAL '14 Proceedings of the 22nd ACM SIGSPATIAL International Conference on Advances in Geographic Information Systems; pp. 133-142; ACM Digital Library (Year : 2014).*

* cited by examiner

*Primary Examiner* — Bradley W Holder

(57) ABSTRACT

This invention establishes a physical corner stone to build upon it a towering cyber space—creating a baseline which is out of bounds for remote hackers, and is tamper resistant to hands on attackers—intended to survive even a catastrophic breach of the host network, and subsequently serve as a leverage to recover from the attack. Foundational security for critical infrastructure.

8 Claims, 10 Drawing Sheets

Skeleton Network Ebedded in a Nominal Network

PEC
Physical Entry Computing Device

Skeleton Based secure Communications Between Stranger Nodes

Off-Line Coomunication Zones (OCZ) within a Network

$$\text{Host} = \sum_i OCZ_i$$

Skeleton Box Configuration - Nominal

Skeleton Box Configuration – DAB routing option

Skeleton Box Configuration – Two DABs option

Bridged Skeleton Network

Bridge-Based Cross Network Communication

Satellite Based Skeleton Network

Raw key Material

Elements of a skeleton box

Skeleton Recovery Illustration

Rock Destruction Mechanism

DABS in the cars, not in the control center

One-Way DAB v. Two-Way DAB

Chain of DABs

SKELETON NETWORK: PHYSICAL CORNER STONE FOR THE TOWERING CYBER HOUSE

This Application is filed as Continuation in parts of U.S. patent application Ser. No. 15/293,352

CROSS REFERENCE TO RELATED APPLICATIONS

Provisional Application No. 62/688,387 filed on Jun. 22, 2018; Provisional Application No. 62/689,890 filed on Jun. 26, 2018; Provisional Application No. 62/714,735 filed on Aug. 5, 2018; Provisional Application No. 62/782,301 filed on Dec. 19, 2018; Provisional Applications No. 62/805,369 filed on Feb. 14, 2019; Provisional Application No. 62/813,281 filed on Mar. 4, 2019; Provisional Application No. 62/782,301 filed on Dec. 19, 2018; Provisional Application No. 62/805,369 filed Feb. 14, 2019; Provisional Application No. 62/813,281 filed 4 Mar. 2019; Provisional Application Ser. No. 62/850,720, filed May 21, 2019; Provisional Application No. 62/857,898 filed 6 Jun. 2019.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

Public serving databases defend themselves from cyber security threats by establishing protective protocols, and employing cryptographic tools. This constitutes the information front as a battle of wits, which is virtually impossible to guarantee to win 100% of the time. Breaches seem inevitable. Defenders need to re-imagine their defense, which is what this application does: it defines a super-secure subnet within a regular host network, where security is based on a physical article—a secure enclosure, designed to frustrate a remote hacker, but more challenging—to defeat a hands-on attacker who tries to physically compromise the secure enclosure, as well a cryptanalyst attacking it with either chosen-plaintext or with chosen-ciphertext most powerful attacks.

BRIEF SUMMARY OF THE INVENTION

This invention describes a skeleton network which may be a subnet of a regular host network, where the nodes of the skeleton are linked to a physical data access box (DAB) which houses the shared keys that support secure communication within the skeleton network. The DAB has multiple means to detect attempts to physically compromise it, and so prevent exposure of the key by several defensive options. The DAB is no malleable general purpose computer, it has a rather narrow operational capability—to encrypt, or decrypt. The cipher used by the skeleton network may be "Trans-Vernam", namely it projects security via the undisclosed size of the key—a large quantity of randomness, which as long as it is larger than the bit-count of the sum of the messages processed via the DAB, is projecting mathematical security against any cryptanalytic attack. The DAB will destroy the key inside it when the amount of messaging it processed exceeds a preset value. In summary, therefore, the DAB resists physical attacks, and cryptanalytic attacks, and as such it establishes the network it supports as immunized against a remote attacker, and even makes it very difficult for a hands on attacker to compromise it (protected against a sophisticated lab, and against a chosen-plaintext, and chosen-ciphertext attacks). The role of the skeleton network is to be a super-secure subnet within its host, and also serve as a recovery leverage from an event in which the non-skeleton nodes of the host network have been compromised.

Cyber war is a battle of wits, and that's why it's such a problem. The defender of data assets must win every round, while the assailant is victorious upon the first breakthrough. This means that despite any talent, and means advantage in favor of the defender, the persistent assailant will eventually prevail. This battle of wits rages in the in the battleground comprised of computer memory, data switches, and communication lines. The defender designs security protocols, and the assailant discerns vulnerabilities therein. One way to tip the scale in favor of the defense is to constitute this ever towering cyber house on physical cornerstones.

Physical foundation for one shrinks the battleground to the very physicality of that foundation. In cyber space per se, attacks can come from all corners of the globe, and if there are extraterrestrials somewhere they can defeat us too.

Two distinct ways to anchor cyber space on physical cornerstones are under consideration:
1. The Rock of Randomness
2. The Secure Enclosure The first is described in U.S. patent application Ser. No. 15/898,876 And the second is described in U.S. patent application Ser. No. 15/293,352

This application describes a system and related methods to use the Secure Enclosure to achieve network security. Yet, the operational situation is equally applicable to a "rock of randomness" where it is used in lieu of bit-wise captured key material. The rock of randomness may also operate without an enclosure because its data is not bit-drainable as easily as a bit-wise storage.

The system in this application is called a "skeleton network". The skeleton network may be stand alone, or a subset of a larger, host network. It is a network with physical anchorage for security—physical implements need to be violated to break it. Software wizardry will not be sufficient. The skeleton network is comprised of skeleton stations that communicate among themselves either through dedicated communication lines, or through the host network communication. The skeleton network provides higher security operation in normal mode, and it is the means for recovery from a break of the host network. The idea being that due to its physicality, the skeleton network will not be affected by a breach of the host.

We describe a host network anchored on a skeleton network. The host network is comprised of regular nodes: $h_1, h_2, \ldots$ and of skeleton nodes: $s_1, s_2, \ldots$. The regular "h" nodes, can send and receive data from all other nodes. The skeleton "s" nodes can send out data to any node in the network, but they can accept data only from another skeleton station. This configuration implies that as long as no skeleton station was compromised, the communication within the skeleton stations is not compromised either, regardless of any break of the rest of the network (the "h" nodes). By anchoring the skeletons station on a physical implement, this subnet is resilient to software, battle of wits, hacking. And is clearly immunized against any remote attacker.

The skeletons network is positioned within the host network such that this host is divided to "off-line communication zones" (OCZ). An OCZ is a zone comprised of nodes of the network for which it is feasible to exercise an offline communication between the nodes: passing data not through the network communication protocols. By so dividing the network any node $h_{ij}$, (node j in $OCZ_i$), can communicate with any other node in the host network, $h_{kl}$ (node k in $OCZ_l$) by:

1. Off line communication between $h_{ij}$ and skeleton station $h_j$ of $OCZ_j$. 2. Secure Communication between $OCZ_j$ and $OCZ_l$—the skeleton station of $OCZ_j$ 3. Off line communication between $OCZ_j$ and $h_{kl}$.

This secure communication mode can be used in nominal operation by having $h_{ij}$ exchange a secure key with $h_{kl}$ and use that secure key (known only to the communicating parties and the skeleton network) to communicate securely. And it can be used in breach recovery mode as soon as the communication lines of the skeleton network are re-established.

The skeleton network solution requires off-line setup of the skeleton stations. The stations all include a data access box (DAB) which contains key material, captured in the physicality of the DAB, and never exposed to software and communication lines, These boxes must be transported in the physical world in order to insure their security support. This is a realization of the premise of physical anchor on which to construct the ever growing cyber construction. The inconvenience of this physical transport of the DABs is the investment needed to insure security, and retain an uncompromised kernel from where to bounce back from an infiltration of the host network.

The feasibility of offline communication between the "neighborhood" skeleton stations and the host nodes serves as a basis to physical establishment of identities of the nodes.

The skeleton network can communicate within itself using the BitLoop protocol, and thereby hide also the communication pattern within the skeleton network.

Skeleton System Components

The skeleton network is comprised of skeleton stations connected either through dedicated lines or through communication based on the host network where the skeleton network is embedded.

The skeleton box is comprised of (i) a physical entry communication device. PEC device, and a data box, DAB. These two components may be arranged in a basic configuration as follows: The DAB is connected to a host communication line as its input. The DAB has a corresponding output line towards the PEC. This DAB-2-PEC communication line is the only remote entry to the PEC. This is critical. All other data entries to the PEC, or physical, non-remote. May be keyboard, a camera, or a USB stick entry port, but no network based entry except th DAB-2-PEC line. In addition there is a closed circuit comprised an output line from the PEC to the DAB, and a corresponding line of communication from the DAB to the PEC. There is one more communication line extending from the PEC to the host network. This line is one-directional. It only allows data to go from the PEC to the network, not in reverse.

The Physical Entry Computing Device (PEC)

The PEC is a computer device connected to the host network but designed with two special features:

1. It only pushes information to the host as a regular computer, but all the information that comes from the host to the PEC is "filtered" through the Data Access Box (DAB). "Filtered" here means that the influx flow from the net is invariably decrypted with the resident key of the DAB, and resultant plaintext is pushed to the PEC. That means that all the data flow from the host network to the PEC is routed via the DAB and undergoes decryption.

2. The port through which the PEC sends information to the host is one-way. No information can flow in the reverse direction.

3. All other data exchanges of the PEC are physical-local. A human being may be using a keyboard, a microphone, a camera, or a USB port, but no remote data entry. The PEC has a screen and a keyboard and all other devices that are common, but no WiFi, no network connection. The PEC is operated like a normal computer otherwise.

The PEC has a loop connection with the DAB. An output data flow can send any information to the DAB, and a corresponding return flow sends the encrypted information from the DAB back to the PEC.

The Data Access Box

In its basic form the Data Access Box has a singular function towards which it is optimized. It has no computing capability to do anything else. It takes in plaintext from a plaintext entry port, encrypts it, and sends the cryptogram to the corresponding egress point. And the reverse: the DAB takes in a ciphertext (cryptogram) from a ciphertext entry port, decrypts it and sends out the resultant plaintext to the corresponding plaintext port. The DAB has no memory beyond the temporary memory needed for this operation.

The DAB comes in various grades:

1. Basic Grade: Unsecured Enclosure 2. Physical Security Grade: Secure Enclosure 3. Physical and Crypto Grade: Secure Enclosure plus Key Extraction Protection The basic grade is a simple box that houses the key and the electronics. The physical security grade is a DAB that is tamper resistant as described in U.S. patent application Ser. No. 15/293,352 The third grade has physical security plus a mechanism to monitor how much the DAB has been used. When the measure of usage reaches a predetermined limit the mechanism erases the key.

Every DAB is comprised of:

1. The DAB key 2. The DAB processor 3. Battery 4. Data ports 5. Enclosure

The secure enclosure DAB also has the Tamper Resistance Circuitry, and the physical and crypto grade also includes the key-extraction protection system. See US Patent Application: #15293352

The DAB may be built over (i) standard cryptographic technology, or (ii) over trans-Vernam technology.

DAB Technology

The DAB may be built over (i) standard cryptographic technology, or (ii) over trans-Vernam technology. The essential idea of the DAB is the notion of the physical location of the cryptographic key. It is in the physical box and connected to circuitry with a narrow capability—to encrypt or decrypt based on the key. There are no facilities of general computation nature that can be abused by a smart assailant in order to compromise the key. The key that is kept and secured in the box may be any cryptographic key based on any cipher whatsoever. The encryption and decryption circuitry will have to carry out the respective computation of that particular cipher.

The problem with standard cryptography, is that the ciphertext commits to the plaintext and while it is widely assumed that the prevailing standard cipher are too much of a challenge for the adversarial hackers, this cannot be proven and a measure of doubt is in order. This point highlights the advantage of trans-Vernam ciphers where a mathematical proof guarantees their security up to a well known limit of plaintext, or ciphertext processed. And beyond that the security deteriorates but also in a well known rate, so the user may rationally appraise the risk of a breach versus the damage in case of a breach. The advantage of the DAB is that it is a sizable (at will size) box that can contain a large, even very large key, and hence can handle in perfect (Vernam) security large quantities of plaintext. The crypto secure grades of the DAB will erase the key as soon as it has been used for so much data that from that point on its mathematical security will deteriorate. The combination of the physical security (tamper resistance) and the key-erasure will make the high grade DAB resistant even against circumstances when an attacker secured a hold of the DAB itself. The tamper resistance technology (see U.S. patent application Ser. No. 15/293,352) will prevent the hacker from prying the box open and compromising it, while the key-erasure mechanism will prevent the hacker from running more and more data through the DAB in order to eventually deduce from the pairs of plaintext-ciphertext what is the key that is in the box. The key erasure will prevent running of the DAB for the purpose of acquiring a sufficient number of pairs of plaintext-ciphertexts to allow a cryptanalyst to extract the key from the results.

This high grade physical-crypto DAB is based on this notion of Trans-Vernam ciphers. We elaborate on this concept.

The key in the DAB is best when it is comprised of quantum grade randomized bits. Quantum grade bit sequences are commercially available, (e.g Company IDQ in Geneva, Switzerland). The key material may be large array of quantum grade randomized bits while the software may regard all or part of it as a particular key for a given encryption or decryption operation.

Mathematical Security

Some 25 years after Gilbert S. Vernam filed his now famous "Vernam Cipher" patent, Claude Shannon has proven that this cipher is mathematically secure. That means that having possession of the ciphertext does not improve the chances of a cryptanalyst to find the corresponding plaintext, over the situation of not knowing the ciphertext. It is therefore "mathematical security" (or Vernam security) because the knowledge of the ciphertext is no advantage.

Vernam Security

Claude Shannon proved that mathematical security requires a key as large as the message. But Shannon's proof is not linked to the particular procedure used by Vernam. In general a group, or a set S, of s participants using a key K of size $|K|$ bits will be able to cross communicate up to q messages $m_{ijk}$ between any two participants $m_i$, $m_j \in S$, k=1, 2, ... q in perfect secrecy as long as:

$$|K| \geq \Sigma\Sigma\Sigma |m_{ijk}| \ldots \text{ for } k=1, 2, \ldots q; i,j=1, 2, \ldots s$$

This simple statement is the basis for a viable skeleton subnet. It implies that s skeleton stations, each housing a key K will be able to cross communicate among themselves with an aggregate communication of bit count equal or less than $|K|$ and do so with guaranteed mathematical security. The transpiring q messages between any pair of skeleton stations will remain secure no matter what happens with the host network, how badly it is compromised. The attacker may at most disrupt the host network, which will inhibit the communication among the skeleton stations but it cannot infiltrate the skeleton subnet. It cannot hammer the ciphertexts to extract the plaintexts.

Because cryptography pivoted away from Vernam to short, very short keys, it neglected to seriously pursue the question of what happens when the total bit count of the exchanged messages begins to spill out of the $|K|$ limit. Equivocation diminishes. Up to total message size equal or less to $|K|$ full Vernam equivocation holds, all 2n possibilities of plaintext serve as plaintext candidates ($|K| \geq n$–bit count of all message processed). As the message size exceeds $|K|$ the measure of equivocation diminishes, and as the total message size keeps growing the equivocation is diminished until it is totally wiped out and at that point only intractability protects the encrypted secret. How fast equivocation disappears depends on the cipher used, and there comes an important design challenge to keep equivocation around for larger and larger message sizes. The important feature of this situation is that the transition from the Vernam zone to the diminished equivocation zone and from there to the intractability-only zone are credibly calculated by the user. Noteworthy—mathematical vulnerability defies any credible estimate of vulnerability because it is based on mathematical insights above that of the estimator.

We regard a cipher as trans-Vernam if it can be used with a cryptographic key that may grow in size without rendering nominal computations prohibitive. And at will its user can throw in enough randomness (large key size) to match the size of messages used with this cipher, and thereby render them into a Vernam equivalent cipher.

Note: while a full Vernam equivocation is most desired, in practice a much more limited equivocation may be sufficient for given circumstances, so even if the total message size exceeds the key size—security may still be largely in tact.

While Vernam cipher is simple to process for encryption and decryption, it is difficult to manage and is extremely uncomfortable to use by a group of secret sharing communication partners. Recently a crop of Vernam-inspired ciphers were developed, patented, and published, and are now in use. They enjoy the property of ease of use, and the possibility of using them beyond the state of Vernam (mathematical) security. Using a Vernam or a trans-Vernam cipher, if a key K of size $|K|$ is installed in the DAB then it can process data M in any amount up to $|M|=|K|$ and all that processing will be carried out with a mathematical guarantee of security. Using the same key for more data will deteriorate the security from perfect mathematical to less than perfect. The advantage to the user is that the rate of deterioration is computable in a credible way (which is not the case with standard cryptography). So the user may limit the use of DAB to mathematical grade communication, or decide to use it beyond that. The described switching from one set of skeleton boxes to another is primarily because of the need to refresh the DABs with new keys because the olds ones have reached the boundary of their mathematical security limit.

Trans Vernam ciphers are further elaborated on in this source:

Trans-Vernam Ciphers: A New Dimension for Modern Cryptography
https://medium.com/@bitmintnews/trans-vernam-ciphers-a-new-dimension-for-modern-cryptography-333bad7ca1a4
The underlying theme was recently published by the world economic forum:
https://www.weforum.org/agenda/2017/11/what-a-100-year-old-idea-can-teach-us-about-cybersecurity Trans-Vernam Ciphers A proper Vernam cipher may incorporate a key K of size $|K|$, and be used to encrypt messages $m_1, m_2, \ldots m_n$, as long as $|K| \geq \Sigma m_i$, i=1, 2, ... n. All the generated ciphertexts $c_1$, $c_2, \ldots c_n$ will be mathematically secure, as Claude Shannon has shown. A trans-Vernam cipher is a cipher that abides by this premise but uses other than the Vernam cipher.

The Vernam cipher uses every bit of the key once. One key bit is used to encrypt (or decrypt) one message bit. There is no re-use of key bits in proper Vernam. A trans Vernam cipher allows for re-use of key bits, and in general the size of the key is part of the secret. There are various ways to achieve this, and the indicated ciphers exhibit some. We offer here a loose description of one trans-Vernam cipher.

BitMap (U.S. Pat. No. 6,823,068): it is based on the premise that a pathway on a graph can be described in two ways: (i) listing the visited vertices, and (ii) listing the traversed edges. One form may be regarded as plaintext, and the other as ciphertext, with the map being the key. As long as the overall length of the pathways (the size of encrypted data) is such that no vertex has been visited twice, then every list of edges can be matched with any desired list of vertices, and vice versa—complete equivocation, much as with Vernam proper. Only when the total length of pathways is such that some vertices must be revisited then some restraint is developed and cryptanalysis can begin. So if the map is not used beyond its full equivocation point, it offers complete Vernam equivalence.

Examples of Trans-Vernam Cipher

BitMix: Full Range Transposition*Transposition Equivocation Cryptography (U.S. patent application Ser. No. 14/714,328)
BitMap: Graphic Pathways (U.S. Pat. No. 6,823,068)
BitHip: Super Poly-Alphabetic Alphabet (PCT/US2017/060188)
BitSpace: Unbound Geometry Cipher (U.S. Patent Application No. 62/813,281)
Trans Vernam cryptography US20170250796A1

Key Elimination Technology

Essential to the DAB is the feature of key protection. The DAB is designed with several attack scenarios in mind. Each attack scenario on the list is met with a proper detector. Once this detector is alarmed, the DAB takes action to protect the secret key from exposure. There are several ways to do so. If the key is a physical 'rock of randomness' then destruction is a challenge. One could possibly melt it, or at least soften the rock and deform it, and thereby prevent the proper reading of rock data, but that would require a strong battery. Alternatively one could bore holes in the rock, this would destroy the reading as well.

When it comes to bit-wise keys within the DAB there are several options:

1. cutting off power from 'live data'
2. mass erasure/rewrite
3. replacement

They are all sufficiently fast and effective. Replacement comes with a deception aspect. It calls for replacing the actual key with a key look-alike, using some white noise or other source of randomness to fool the attacker that he succeeded in extracting the key. It would hamper and slow down the attacker until he finds out that he was deceived. The replacement defense works for both physical assault and cryptanalytic assault.

DAB Components

Every DAB is comprised of:

1. The DAB key 2. The DAB processor 3. Battery 4. Data ports 5. Enclosure

The secure enclosure DAB also has the Tamper Resistance Circuitry, and the physical and crypto grade also include the key-extraction protection system.

In the basic DAB without the physical and crypto security apparatus the key can be in form a flash memory or any other permanent memory. For DABs with physical and crypto security it is necessary for the key to be "live" kept on through a built-in battery with sufficient power to support the designed processing capacity of the DAB. So for advanced DABs the key is supported by a built in battery. The key is used by the processor built into the DAB. The processor is a computing device designed specifically to carry out the computation of the applicable cipher. In variations where the DAB assumes the routing functions the processor will include these functions too.

The DAB key can be comprised of a "random rock" as described in US Patent Application: #15898876

The data ports may be physically made unique to prevent hooking something else to the DAB.

The enclosure in the basic format may be either screwed shut and hence can be opened for replacing the key material or replace a faulty component. But it may also be made welded shut so it has to be disposed of once out of use. In the physical security format one or more of the tamper resistant means described in U.S. patent application Ser. No. 15/293,352 will be applied.

The advanced DABs will have the physical security circuitry as described in U.S. patent application Ser. No. 15/293,352. This circuitry will erase the key when insulted.

The crypto grade will have circuitry that will monitor the amount of data that is being processed by the DAB and will invoke a key erasure when the measure of the data used reaches a preset limit. This will prevent a cryptanalyst who got a hold a DAB from running it with so much plaintext (for which it will read the ciphertext) until the cryptanalyst will have enough information to deduce the key.

Alternative System Construction

Several variations may be used in constructing the skeleton system. We describe the following:

1. Installing the routing function into the DAB 2. Simplifying the DAB for a separate unit for encryption and a separate unit for decryption 3. Integrating the DAB into the PEC In option 1 the DAB may be built so that it is responsible for all the communication between the PEC and the host network. This will void the need for a loop connection between the PEC and the DAB (no need for the PEC to send plaintext to the DAB to be returned encrypted).

In option 2 the DAB is further simplified: a dedicated unit for encryption and a dedicated (separate) unit for decryption. Each unit will have a single entry port and a single exit port.

In option 3 the entries skeleton station will be integrated into one box that includes the PEC and the DAB with all the connections are internal.

Skeleton Network Methodology

We now describe how the skeleton network system is being operated. We describe the Skeleton Network as embedded in a host Network. If the host network shrinks to zero, we have the stand alone skeleton as a private case. There are the following phases:

1. Priming 2. Nominal Operation 3. Recovery Operation 4. Closing Down

Priming is the phase where the system is prepared for its normal operation. A skeleton network may be mounted on top of a host network, ready to operate. Alternatively the skeleton network is constructing around it a host network. Such construction may require a thorough off line verification of identities of the host nodes. Nominal operation refers to the on going operation of the host with the embedded skeleton. Recovery operation refers to the methodology of bouncing back from a breach of the host network. Closing down is the phase when the skeleton network is terminated. This may be either because the host network terminates, or because the strong security measure is no longer warranted, or, because the skeleton network has exhausted its resources (its 'fuel') and must be replaced. It is also possible that the skeleton is replaced in order to install a better solution to the same security challenge.

The basic premise of the skeleton network methodology is that all data that streams in to the skeleton computing device coming from the host network, is routed to the DAB where it is invariably decrypted using the key in the box. No data flows into the computing device (PEC) from the network without going through the DAB for decryption. This premise serves to guarantee the integrity of the communication within the skeleton network. Any information stream that was not previously encrypted within some other box in the skeleton network would turn into garbage when it comes out from the DAB—decrypted. And for that reason no hacker could hope to feed any malware into the box because no hacker would have knowledge of the secure keys inside the skeleton boxes.

Two or more skeleton networks each embedded in its own host networks can be bridged together.

Priming

Priming includes (i) design, (ii) construction of the skeleton boxes, (iii) charting offline communication zones, (iv) preparing off line communication protocols, and then (v) installing the skeleton network, followed by (vi) testing, and (vii) certification for service.

Design

Skeleton Network design includes:

1. Cryptographic Design 2. DAB Design 3. PEC design 4. Configuration Design 5. Interface with the Host Network Design The design must be based on a threat analysis to the host network and the skeleton network. Attach scenarios should be charted and the way to handle them must be specified, and guide the design.

Construction of the Skeleton Boxes

The construction of the skeleton boxes incorporate introduction of the key material. In the advanced versions of the box, the key material will have to be "live" kept on with the power. The key material will have to be duplicated for all the manufactured boxes, and this process will have to be done with proper secrecy.

Charting Off-Line Communication Zones

The more skeleton stations there are, the smaller will be the offline communication zones, and the easier it would be to maintain offline communication. This process includes a protocol for revalidation and for getting new entries to the host network. Host network nodes will have to prove their identity offline to the local skeleton station, and receive from the station key material (off line) which they will use online for communication with other host nodes that received the same key material from their local skeleton stations. The shared key material will be securely communicated between the skeleton stations.

Note: the phrase "key material" is used here to signify a string or a block of random bits which software would subsequently refer to when defining a cryptographic key off that string or block.

Installing the Skeleton Network

This step includes a secure offline shipping of the skeleton boxes to cover all the areas where the host network operates.

Nominal Operation

Nominal operation is comprised of (i) independent skeleton-only communication, and (ii) host-support communication.

The skeleton boxes will communicate among themselves independent of the any data traffic in the host. The skeleton network will support the host by providing secure keys to be shared by two or more nodes anywhere in the host network. This happens by each of the key sharing nodes communicating off line with the skeleton box in its off-line communication zone, the respective boxes communicate security among themselves. This will apply to existing nodes wishing to refresh they shared secured key, or to new nodes that need to establish secure communication with any other node in the host. All this applies similarly to three or more nodes sharing a key. The offline communication will be used to affirm identity of nodes in the offline mode.

Nominal operation operates with the skeleton traffic projecting mathematical security, but in the simple mode it does expose its traffic pattern to the host network. In very sensitive situations communication pattern—size and frequency of messages—is too expository to an adversary. The skeleton user may then opt to use the BitLoop protocol and hide the pattern from the host network and any the prying eyes. The BitLoop protocol is defined in U.S. Patent Application No. 62/850,720

Independent Skeleton Only Communication

Independent skeleton operation applies to the communication among the skeleton boxes, regardless of what happens in the host network. This operation may be carried out in two modes: (i) shared key communication, and (ii) key matrix. These modes are explained in U.S. patent application No. 62/850,720. In the shared key case, all the skeleton boxes contain the same shared key. That means that all the communication between and among the skeleton boxes will be exposed to all the boxes. In other words, there would be no confidentiality within the skeleton boxes in the network.

In the matrix operation the n skeleton boxes will all have their keys: $K_1$, $K_2$, $K_3$, ... $K_n$. And each box will have knowledge of at least one other box key, and possibly will know the keys of all the other (n−1) boxes. A matrix will list which skeleton box knows which keys. Some of these keys may be identical. If all keys are the same this matrix mode collapses to the shared key mode. According to the key matrix the skeleton boxes will be able to communicate with one or more of the other skeleton boxes.

For the purpose of recovery and general convenience the shared key is important. Therefore the builder may opt to establish both modes in parallel. All boxes will have one shared key to communicate among all of them, and in addition every box will have its own key that will allow selective communication per the matrix.

Host-Support Communication

The skeleton network will routinely support the host network (i) by routinely distributing refreshed keys for its operation, and (ii) by providing identity verification services via its offline communication zones. The skeleton network, considered part of the host, will be used for communication of the most secret information.

Concealment of Pattern

U.S. Patent application No. 62/850,720 describes how an embedded sub-network may practice the BitLoop protocol and thereby hide its use pattern. This is fully applicable to the skeleton network.

Using BitFlip, the skeleton network will operate in a constant data flow, hiding from the rest of the host network and others the extent and pattern of actual communication that transpires within the skeleton network.

Recovery Operation

In the event that the host network is compromised, the skeleton network is assumed to stay clean, and be used to bootstrap the host after the breach. First the raw communication lines will have to be established. Then a hierarchy of shared keys will be established within the host. The first layer of the hierarchy will be based on a single cryptographic key $K_h$, shared throughout the host network. Steps:

1. The skeleton network agrees on a shared recovery key, $K_h$. This will be done by sharing the key through skeleton network. 2. Each skeleton station will communicate $K_h$ to all the host nodes in its offline commutation zone. 3. The host nodes will start communicating with each other with $k_h$ Similarly any sub group, g, of nodes within the host, will discuss in the open a request for a shared key, $K_g$. The skeleton network will respond by communicating among the skeleton boxes to agree on a value for $K_g$, and share this value through all the stations that have in the their OCZ one or more nodes from the group g. Subsequently the stations off-line communicate with the members of the group g, the value of $K_g$. When done the group g, is ready to send data securely through the host network, and keep security within the group.

After a breach all the old keys used by the host network are discarded, and as described above, all the keys will be new.

In the event that the breach involves a fault in the cipher used by the host, then this cipher will be replaced over open communication. The secrecy will be limited to the key material.

Closing Down

Closing down is simple for the case where the service of the skeleton is terminated. A date certain must be announced with exact termination time, and all the skeleton boxes will be decommissioned at that point of time. The host will operate similarly to how it operated before the skeleton network was installed. It will use the shared keys that were facilitated by the skeleton but will not have the skeleton anymore for refreshing these keys.

A bit more involved is the situation when the termination of the skeleton network is for the purpose of replacing it with a new skeleton network. There are two possibilities: either the new skeleton network is congruent configuration-wise with the terminated network, or different.

If the new skeleton network fits the old configuration then there is no impact on the host. The new boxes must be ready to be switched in in a perfect timing across the host network. If the configuration changes and so the offline communication zones are redrafted then there will be an impact on the host, and new protocols will have to be pre-developed for the new configuration.

Bridged Skeleton Networks

We consider a situation where some m host networks $H_1$, $H_2$, $H_3$, . . . $H_m$ are each hosting a skeleton network $S_1$, $S_2$, . . . . $S_m$ respectively. Each of these skeleton networks will designate one skeleton box as the bridge-connection box, let it be box h in skeleton network i=1, 2 . . . m. Each of these skeleton networks bridge boxes will house a special bridge key, which is the a shared key for the m bridge boxes. One would then establish a communication network between the m bridge boxes so that they can communicate with each other. This bridge box to bridge box communication is separate from any communication lines in the m host networks. It may be a dedicated satellite connection.

Such bridge configuration will allow communications between the nodes in the different hosts, and facilitate connections between alien networks. Such communication will be much more cumbersome than node to node communication within a single host network. A bridge mode is not a host unification mode. This bridge configuration will work even if the various skeleton networks are quite different from each other; one may be physical and crypto secure and the other will be neither.

The bridge connection has a distinct advantage over a merger of the m host networks. It allows cross networks communication while maintaining a clear separation between the m host networks. If one host is compromised, the other are fully immunized against a viral propagation of malware because the only connection between the networks is through the bridge. Using the bridge, all the information flow between host networks is limited to skeleton box to skeleton box communication, and to any attack that crosses into the host networks from the background network. The background network is a network that hosts the hosting networks. It applies to the Internet. The nodes of the hosts networks may be regarded as particular nodes of the background network. The background network may itself be an offline network, like a regular mail service, faxes or phones.

The important aspect of the bridge cross-network communication is the fact that while the two cross network nodes can only communicate over the background network, they do so via the secret key that that bridge configuration allowed them to share.

The bridge configuration will allow two strangers to communicate while remaining strangers to each other. They may identify each other functionally. One node in host $H_1$, may ask to communicate with the node in $H_2$, which is responsible, say, for weather data, or for some accounting data, etc. The request is directed towards a node that fits certain parameters. The bridge protocol will allow the skeleton network in $H_2$, to identify the node that fulfills the specified parameters (specifications), and pass to it the shared key, to allow for the cross network communication when both nodes defer to their "mirror" node within the background network. The mirror node is similar to the host node, only without qualification to be a member of the host network.

Skeleton Network Implementation

We consider the following implementation options:

1. stand alone 2. Host-to-Skeleton 3. Skeleton-to-Host 4. Super Host

In the standalone option the skeleton boxes just talk to each other over dedicated communication lines, which may be totally exposed because the security is anchored inside the boxes. In the Host to Skeleton (H2S) mode there is an operating host network into which one builds the skeleton network. In the Skeleton-to-Host (S2H) mode, one first constructs the skeleton network, and then builds the host network around it. In the super-host implementation the host is a subnet of a more encompassing super-host, which in turn can house more than one host-skeleton systems, which may or may not be bridged.

The connections among the skeleton boxes may assume any valid configuration like ring, star, and full direct connections.

Stand-Alone Skeleton Implementation

A set of coordinated skeleton boxes may establish a stand-alone network, not hosted by any hosting network. They will have to establish their communication lines. They may be of any mode (star, ring, etc.). The communication can be fully exposed because security is hinged on the content of the boxes. So the skeleton stations ("boxes") will be able connect through a single center-star station, which may be a launched satellite, connecting to all the other earth-bound stations.

Host-to-Skeleton Implementation

In this case there exists a host network and one plans to fit it with a skeleton network.

We consider 1. simple skeleton installation 2. full capacity skeleton installation In the first option, skeleton stations simply sign up as regular nodes in the host, and communicate through the host protocol. The skeleton network can then serve the host by securely connecting any two non-skeleton nodes.

In the full capacity installation the host network will be divided up to offline communication zones. Each OCZ will he fitted with one skeleton station. Procedures for off line communication with the OCZ station and the OCZ regular nodes will be established, to facilitate all the required services.

Skeleton to Host Implementation

In this mode, the skeleton network is established first. Then one establishes a protocol for the host network, and invites nodes to register, each to the most convenient skeleton station. Thereby the host nodes proliferate to build the full host network.

Super Host Implementation

In this mode the action starts with one encompassing network, likely the Internet. Then one establishes an extra protocol step to discriminate among nodes that belong to a host network within the encompassing network. Then a skeleton network is established within the host network. Several such host-skeleton arrangements can be set up, and they can build cross bridges between them.

Skeleton Administration Post

The skeleton station may be fitted as the key element in a Skeleton Administration Post (SAP) which also includes a regular node that is part of the host network. This node is referred to as the "Skeleton Detachment Node", SDN. It is a regular node like any regular node in the host, only that it is administered by the skeleton station administer. The SDN may receive information from other network nodes (which the skeleton station can't). That information may be evaluated by the SAP administer who may then use this information to fashion any physical entry to the skeleton computer that is only connected to the DAB. At most this connection may happen through a USB stick that is written on by the SDN. It is not advisable, because it may allow for malware to find its way to the skeleton station, but it is the responsibility of the SAP administrator to weigh the risk. Since there is no direct connection between the skeleton detachment computer and the skeleton physical entry computer (PEC), there is no risk for direct malware transfer.

Asymmetric Implementation

The skeleton network may be implemented in an asymmetric fashion wherein the secure enclosure is limited to either encryption, or decryption, but not to both. Also, a skeleton network may include stations without the DAB, where the key is secured in a more conventional way. There are many applications where some form of asymmetry is useful.

We focus on the following:

1. Partial DAB Implementation 2. One-Way Skeleton Stations 3. Two-DAB Stations

Partial DAB Implementation

Nominally all the stations in the skeleton network will be equipped with a DAB. But this requirement may be relaxed, allowing to some stations to hold the skeleton key in a more ordinary fashion, not secured in a physical DAB. This will harm the overall security of the skeleton network, but will earn its implementers valuable convenience and efficiency.

A typical case is a 'star' implementation where a central controller communicates with a large number of skeleton stations. It would be inconvenient for the control center to manage a large number of physical skeleton boxes. The center may, instead, trust its own perimeter security and house the keys of the stations it controls in a more ordinary way, which makes it easier and more efficient to manage.

For example a modern control center for cars on the road, will house its copies of the large number of cars it controls in a regular database, while the skeleton stations in the cars themselves will house their key in a physical DAB.

One-Way Skeleton Station

A skeleton station may be equipped for encryption-only, or decryption-only. The respective box will only be capable of one way processing. Also, a skeleton station may operate with two or more DABs with different keys, all housed in one station.

Illustration: a sensitive environmental sensor is tasked with reporting its readings to a control center. There is no special need to calibrate or modify the instructions to the sensor. Its mission is fixed, to read environmental data and report it back, be it text, audio, or video, to the respective control center. Such a sensor may be equipped with an encryption only DAB.

Illustration: an automotive car may be equipped with a decryption DAB to accept securely remote control instructions, while its reports on status and reading are carried out in a conventional way. This will help protect the car from malicious attack designed to damage the vehicle and or its passengers.

Two Dab Stations

A skeleton network comprised of two stations, A and B, may operate with one shared key, $k_{ab}$, but can equivalently operate with two DABs each, where one DAB is used for encryption and the other for decryption, in one station, and respectively, symmetrical, in the other station. So station A will use key $k_a$ to encrypt messages for station B, and in parallel use key $k_b$ to decrypt messages coming from B. Station B will operate symmetrically: It will use one DAB (with key $k_a$), to decrypt messages from station A, encrypted with $k_a$, and will send messages to station A using key $k_b$.

Functionally the two DAB construction is equivalent to the single ($k_{ab}$) construction. However, the double DAB will afford flexibility. One DAB may be fully protected against physical tampering and soft cryptanalysis and the other may be less so. Another option is for one to use a large key to accommodate perfect security for large quantities of messages, and the other will house a smaller key. Having two DABs also implies that the attacker will have to compromise two DABs to get the same measure of breach as achieved by compromising one DAB in the single DAB option.

BitLoop

The skeleton network may be implemented as the Bit-Loop protocol. (The BitLoop protocol is defined in U.S.

Patent Application No. 62/850,720). By so doing the skeleton network will hide its extent and pattern of activity.

The implementation may be based on one shared key, or it may operated with a sequence of keys.

The key sequence mode is defined as follows:

The skeleton network is comprised of n stations: 1, 2, ... n, ordered as 1-2-3-..-i-.-n. Let j=i+1. Station i (1, 2, ... (n−1)) operates with two DABs, $DAB_i$ and $DAB_j$. $DAB_i$ is used to decrypt messages coming from station (i−1), except that for i=1 $DAB_i$ is used to decrypt messages sent from station n. $DAB_j$ is used to send messages to station j, except that for j=n, $DAB_n$ is used to send messages to station 1.

The messages coming from station (i−1) are decrypted in station i. The resultant plaintext may be treated according to the BitFlip protocol, and then encrypted through the other DAB and sent ahead to station j.

This defines a proper BitLoop communication pattern.

The plaintext as described above may be processed via a shared set of BitLoop keys. Accordingly there are two layer of encryption/decryption—the DAB layer and the BitLoop layer.

Topologies

The skeleton network may be implemented in various topologies: star, ring, tree, free network.

Within these topologies the skeleton network may be implemented with a single shared key or multiple keys. Any fixed station-to-station connection may be implemented with two DABs one for encryption and the other for decryption. Any segment of t stations, 1, 2, . . . t may be implemented with one-way DABs such that what station i uses for encryption, station (i+1) uses for decryption.

A ring topology may operate with two counter current streams for better efficiency, or for better security. Counter current streams may operate with a shared single key, or with a sequence of keys.

Topologies may grow in complexities on account of juncture skeleton stations. These are stations that use one DAB to connect with one skeleton network, another DAB (and another key) to connect with a second skeleton network, and so for three, four, or more networks. It is akin to the bridge-architecture, except that its purpose is not to connect regular host network nodes from different host networks, but rather to establish links, and possible hierarchy in the larger universe of skeleton-grade secret communication. If a juncture skeleton station operates, say, four skeleton networks, each with a different key, then if one skeleton network is compromised, the others are not affected because they use different keys. The secrets coming from all four networks are mutually regarded and mutually evaluated within the shared PEC.

Proactive DAB Destruction

The skeleton administrator may be equipped with a proactive option to destruct the data contents of the DAB. Or in case of the "rock"—a proactive means to destruct the rock. This would be at the discretion of the administrator upon concluding that an overpowering threat is imminent. While the DAB may be engineered to withstand an assault of an adversary taking a hold of the DAB, it is safer to annihilate the sensitive data as a pre-emptive step.

Local Monitor Skeleton Implementation

The PEC is limited to physical local entry except to the feed in from the DAB. We nominally assume that such local data entry will have to be humanly handled and hence immunized from remote interference. But that is not necessarily the case, In some cases this physical local data source ma be automated. We consider, for example, a remotely deposed environmental reading station where the PEC may be connected to a host of readers like pressure, temperature, humidity, etc. Video and audio recorded may be included. Such readers may be considered as local physical and their entry will be allowed to the PEC, which can then encrypt them with the DAB and send these readings securely to their destination.

"Rock" Skeleton

Everything described above with respect to a physically protected key on account of a secure enclosure, will be equally valid with respect to capturing the secret key in the form of the "Rock of Randomness". There are operational differences. The "rock" may contain a very large amount of randomness and may be operated as an oracle, as described in the application (Ser. No. 15/898,876). The 'rock' may be placed within the secure enclosure, attached to a "rock destruction mechanism" that would be activated as a pre-emptive action upon detection of an assault.

The "Rock Destruction Mechanism" may be a battery-operated drill. When activated a well-positioned drill will drill one or more holes through the rock. The act of such drilling will irreversibly distort the resistance readings between any two points on the rock. The drill cannot be undone.

Security

At its most advanced state the security of the skeleton network is based on:

Physical Box Security

"Vernam Death"

Decrypted Entry

A less advanced states will be less secure as the case may be.

The skeleton network is comprised of some n communicating stations (skeleton stations), designed to withstand any remote attack, as well as certain attacks from trust-violating insiders.

A remote attacker, by definition, has access to the communication traffic between the skeleton stations. In the most advanced state this communication is "Vernam Grade", namely projects perfect, mathematical security, as discussed below. That implies that no "hammering" of the ciphertext will yield the concealed message. The remote attacker may wish to introduce malware to redirect the skeleton station for its purposes—as is normally done to publicly exposed networks. The skeleton system protects itself against this eventuality by the construction in which all the data that flows into the system from a remote source is invariably decrypted using the key sealed in the skeleton box. With this construction, the only way to send a piece of crafted malware is to first encrypt it with the same key which decrypts it upon entry (or, to be exact, to encrypt it with the key that would cause the decryption key in the skeleton station to decrypt that ciphertext back to the original plaintext). But to do that the attacker will have to have possession of the skeleton key, or knowledge thereof. To have that knowledge the attacker will need physical access to the skeleton station, in which case the attacker is not strictly a remote attacker. The system is protected by the physical housing of its cryptographic key.

The physical housing of the cryptographic key—the data access box, DAB, is first protected against a variety of possible tampering attempts, as identified in the underlying patent application, for which this one is a continuation (Application #15293352).

We now consider an attacker who got a hold of the DAB with the key inside, but knows better not to try to crack it open lest the key will be wiped out. Instead the attacker uses a soft attack. He feeds the DAB with many combinations of input data, logging the output data, hoping to gather enough pairs of input-output to deduce from them the identity of the key. This is a valid attack strategy on all common ciphers. However, it fails over a trans-Vernam cipher, as long as the quantity of data processed is smaller than the key. The box (the DAB) in the advanced state will be equipped with a data use monitor. When the amount of data used exceeds the size of key, the use monitor would activate erasure of the key content, much as for physical tampering. This, so called "Vernam Death" will protect the box against a soft attacker trying to deduce the content of the key by using the 'chosen ciphertext' attack.

So in summary, a remote attacker will not break into the skeleton network because it is based on physically protected keys which are out of bound for the remote attacker; the physical attacker will fail on account of the tamper resistant means in the box, and soft attacker (a cryptanalyst) will fail on account of the Vernam Death protection in the box.

This robust protection works also against an untrustworthy insider. In nominal situations a trusted insider can stealthily copy secret key data without leaving any traces for doing so. By contrast an insider who has access to the skeleton box cannot copy the data. Any attempt to do so will result in either erasure of the data (making the skeleton station inspirational, but not compromised), or it will leave marks on the box before erasure. Either way the system is defended against (1) remote attackers, (2) physical violators, (3) cryptanalysts, and (4) trust-violating insiders.

Security Grading

Skeleton stations may be implemented in full security— maximum protection against physical tampering, and perfect "Vernam Death" protection, but they can also be implemented in a less rigorous way. Physical protection has several facets, only one or some of them may be implemented. Vernam death can be applied strictly at the point when the quantity of messages processed exceeds the size of the key, but it may also allow for a certain spill over of message size because the defense of equivocation is not disappearing right away.

Untrustworthy Insider Protection

One of the lingering challenges for IT centers is the risk posed by trust-violating insiders who stealthily copy confidential information in order to either use it directly against the interests of the center, or to sell it to adversarial interests. Lifting off data, leaves no traces, is hard to detect, and is nearly impossible to prove. Data shows that most large system compromises hinge on some help from the inside. With this reality the DAB is of special attraction because the human operators who handle the DABs cannot violate it physically—it's built that way, and cannot secretly cryptanalyze it because of its "Vernam death" protection.

Summary of the Essential Aspect of the Skeleton Network System and Operation

This invention describes a system comprised of a network of communicating elements, where the network is called "skeleton network" and the elements are called "skeleton stations", and where every skeleton station is comprised of a physical-entry computer (PEC), and a data access box (DAB), and where the DAB is a secure enclosure as described in U.S. patent application Ser. No. 15/293,352 with the shared key fitted inside the DAB, and where all remote data that comes into the skeleton station is first routed through the DAB where it is decrypted before it is routed to the PEC, and where the PEC is limited to physical and local data entry, except as to data entry from the DAB; and in addition, each skeleton station is constructed to send messages to other skeleton stations by first encrypting these message through the DAB by routing the plaintext version of these messages in a hard wired mode to the DAB and routing the outcome of the DAB, the ciphertext version, to a target skeleton station in the skeleton network.

This invention offers modification to the above system where the cipher used is one where the size of the key may be set to be as large as desired, and where as long as the total bit count of all the messages processed in the DAB is equal or less than the number of bits in the key in the DAB, the ciphertexts cannot be cryptanalyzed to deduce the key in the DAB, nor can the respective plaintexts be determined, as is the case for Vernam Cipher, and for the ciphers expressed in US patent applications: Ser. No. 14/714,328, PCT/US2017/060188, US20170250796A1, #62813281 and in U.S. Pat. No. 6,823,068; and where the DAB includes a data use monitor that counts the number of bits processed by the DAB, so that when that count reaches the bit size of the key in the DAB, a key-erasure apparatus is activated, and the key is erased.

Another element of this invention modifies the basic system to one where the skeleton stations are fitted as nodes within a host network that carries the communication between and among skeleton stations, and where the nodes of the host network which are not skeleton stations can receive messages from the skeleton stations but they cannot send information to the skeleton stations.

Another aspect of this invention refers to a situation where the skeleton stations are joined with a computing device which serves as a node of the host network but is not a skeleton station, called "regular node", and where the regular node and the skeleton station comprise a skeleton administration post managed by a human controller who can pass information from the PEC to the regular node back and forth, using physical means.

We further describe here a situation where the DAB operates either to encrypt messages, or to decrypt messages, but not both in the same DAB.

Another aspect of this invention describes a situation where skeleton stations are fitted to either encrypt messages to be sent out to another skeleton station, or to decrypt messages sent from another skeleton station, but cannot perform both encryption and decryption.

The system described above is operated on with a method where skeleton stations communicate over exposed channels while preventing a remote attacker from compromising the communication by using cryptographic keys which are all secured in a secure enclosure, and are all erased when they are used to process data of bit count larger than the bit count of the processing key.

This invention also describes a method used with the above system where the host network is divided into "offline communication zones" (OCZ), such that each regular node in the host network is close enough to establish an offline shared key with a skeleton station

Figure 1:
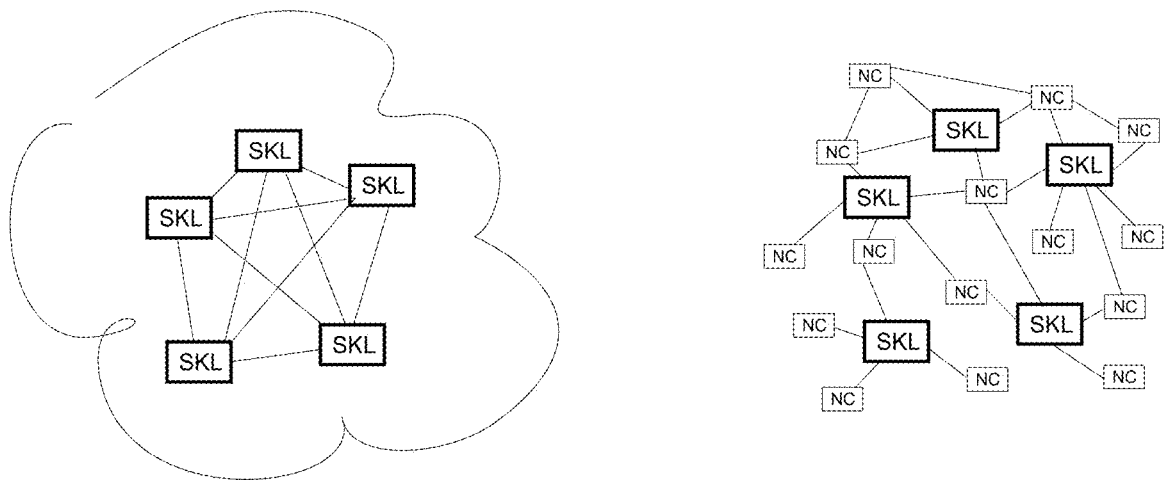
FIG. 1: Skeleton Network Embedded in a Nominal Network

The figure shows on the left a skeleton network, marked a "SKL" boxes which have mutual communication channels, which may be dedicated or may be using communication channels offered by the host network depicted as a cloud. Either way the skeleton box, ("SKL") can run a multi party conversation among them regardless of any communication within the host network. The right side of the drawing shows the same skeleton network where the SKL units are connected to regular host nodes ("nominal computers", NC). The SKL nodes merge into the host.

Figure 2:
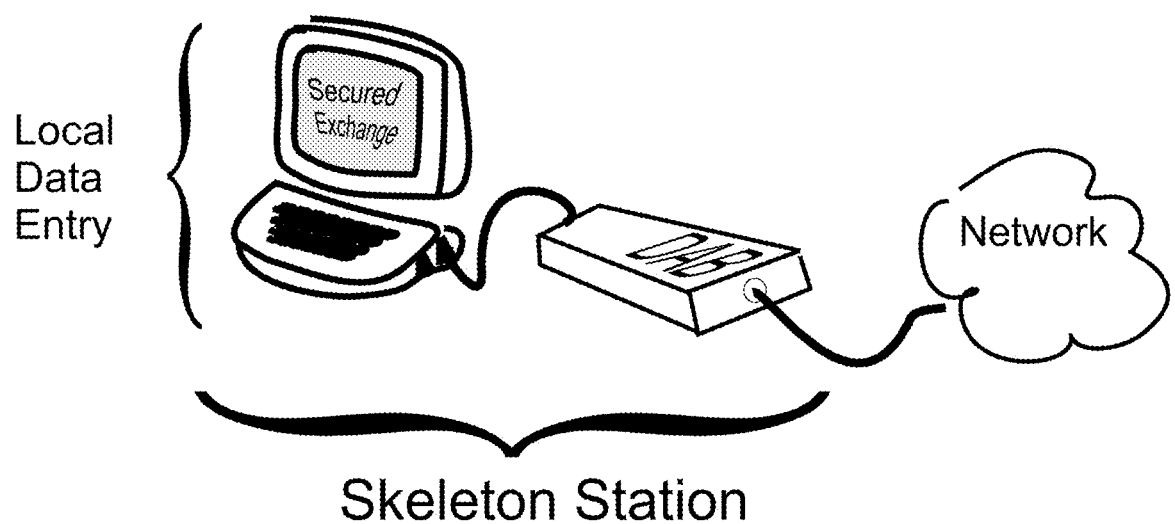

FIG. 2: Skeleton Station

This figure shows the basic elements of the station: the physical-entry computer (no network connection), the Data Access Box, connected to the network. The only way for the network to send information to the physical entry computer is through the DAB where the input is invariably decrypted.

Figure 3:
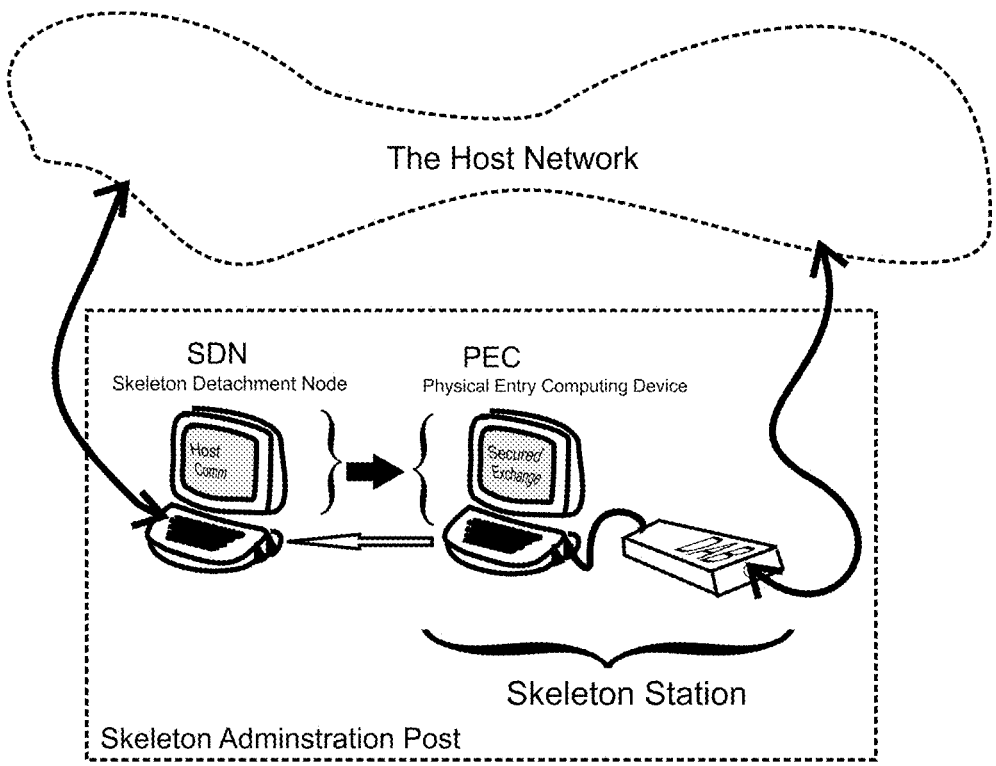

FIG. 3: Skeleton Administration Post

This figure shows the skeleton station depicted in FIG. 2 and the next by SDN (Skeleton Detachment Node). The SDN is connected to the host network as any other node. But it has no network or wired connection to the PEC—the Physical Entry Computer. Information from the SDN to the PEC is controlled by the administrator of the Skeleton Administration Post (SAP). It is passed by keyboard, camera, or a USB Stick, per the physical control of the administrator. Information from the PEC to the SDN passes freely to serve the network. The PEC sends information to the data access box, the DAB where the contents intended for other skeleton boxes is encrypted, and is packed with routing data to guide it to its destination. Other skeletons encrypts their messages to this skeleton station, pack it with routing data to guide the host network to send the encrypted content to this station where the contents if fed into the DAB from where it emerges en route to the PEC as a plaintext.

Figure 4:
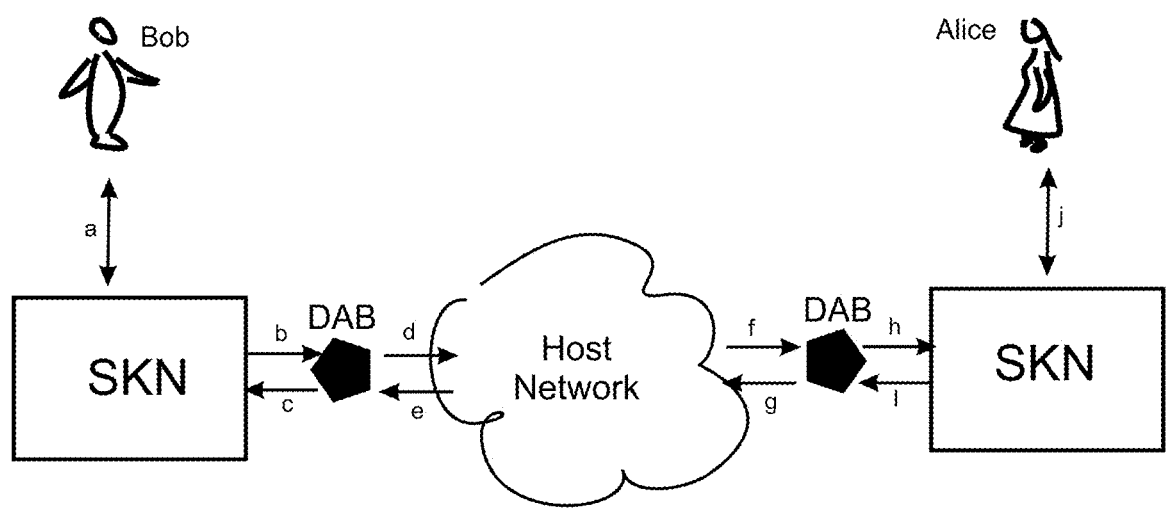

FIG. 4 Skeleton Data Flow

This figure shows how two skeleton nodes (SKN) communicate via the host network, each (Alice, Bob) using their own Data Access Box (DAB). Both Alice and Bob pack their skeleton message SKD in plaintext form (SKDP) with its handling data (HNDP). This pack in this configuration is forwarded to the DAB that generates the encrypted version of SKD (SKDC) associated with its packing data HNDP, and together this pack is routed to the host network. The host network uses the HNDP to figure out how to route SKDC to th proper recipient SKN where it is decrypted.

Figure 5:
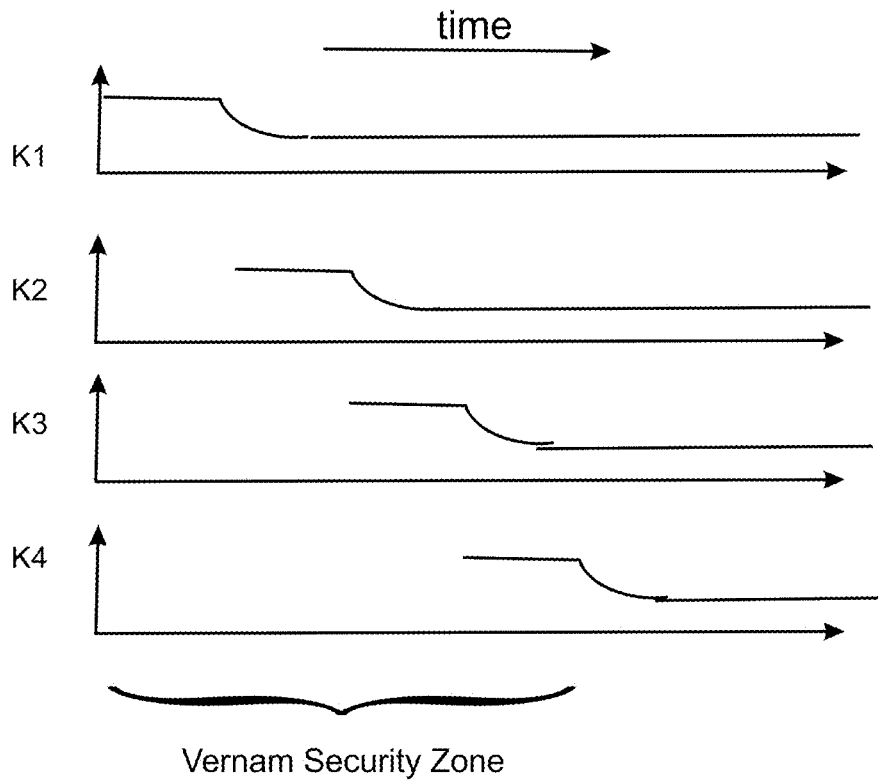

FIG. 5: Staggering Skeleton Keys

This figure shows the use of several keys in succession to insure that all the ciphertext that flows between the skeleton stations is at sufficient high security level (up to Vernam perfection). We see that K1 is used first until it loses its perfection state. It can be used subsequently for the less than top secret information. But for top secret information K2 will be invoked, and used to encrypt data until it too loses it Vernam perfection state. If there are only 4 keys in the DAB they maintain Vernam perfect security until the last key has exhausted its perfect security state.

Figure 6:
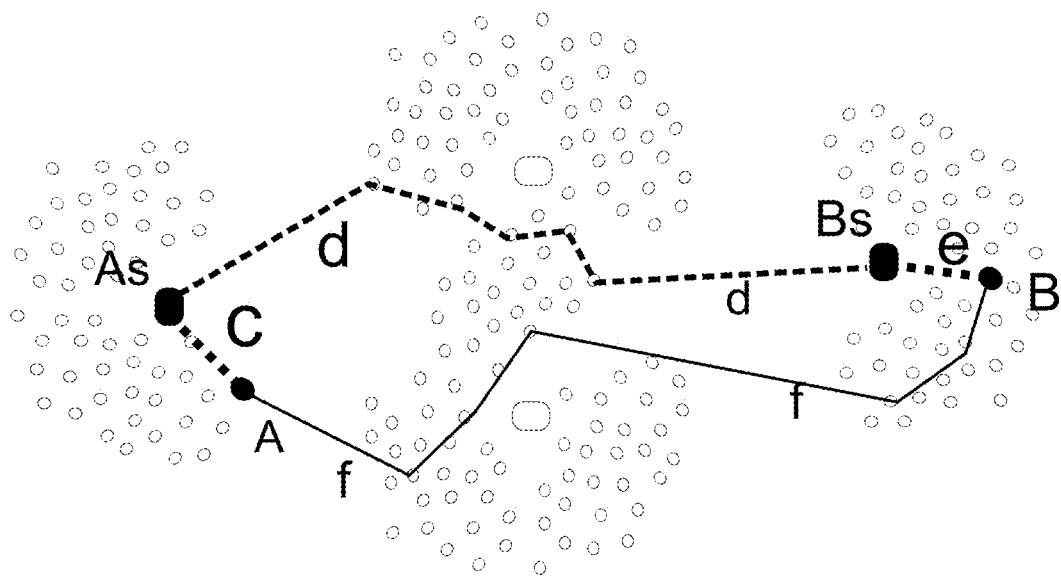

FIG. 6 Skeleton Based Secure Communication Between Stranger Nodes

The figure shows two nodes, A and B in the host network. They are strangers, so they have no prior shared secret key, but they wish to communicate privately. A takes the initiative and contacts its neighborhood skeleton station, $A_s$. The contact may be online based on the secure communication protocol A established with $A_s$, or, if warranted, A may communicate with As offline, (c). In the communication A expresses its wish to establish a secure channel with A. As obliges and provides A with a key, k, to use in communicating with B. $A_s$, then identifies $B_s$ as the neighborhood skeleton station for B, and communicates to $B_s$ the value k, and the validation of the identity of A, which is well known to $A_s$ (d). $B_s$, then communicates with B (again online per their secure communication, or offline if warranted), (e). The communication assures B that it communicates with A per the assurance of $A_s$, and it also passes the shared key, k, to B. Now A and B can communicate securely, being assured of each other identity. Note that this assurance may be per role, or position, not per personal identity. For example A may know it talks with the agent responsible for accounting in a particular company, or B may know that it talks with the resident physical in a hospital. In both cases A and B may not know the name of who they talk to. Usually of course this procedure will expose the identities of one to the other.

Figure 7:
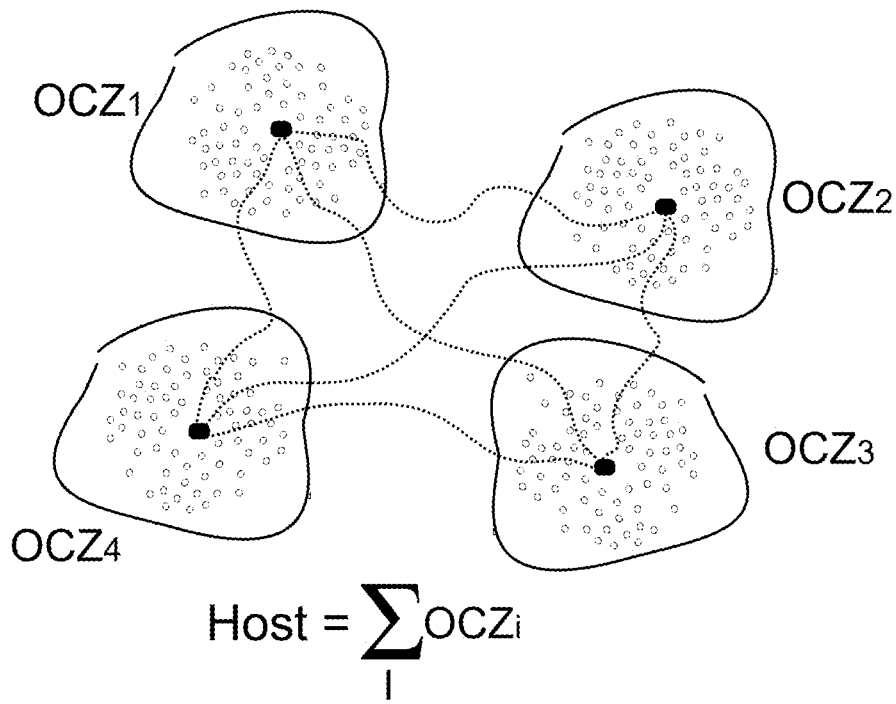

FIG. 7: Off-Line Communication Zones within a Network

The figure shows four offline communication zones (OCZ), each with a skeleton station. All the skeleton stations have lines of communication between them. Every node in every zone can talk with every other node in any other or same zone using shared keys administered by the skeleton network.

Figure 8:
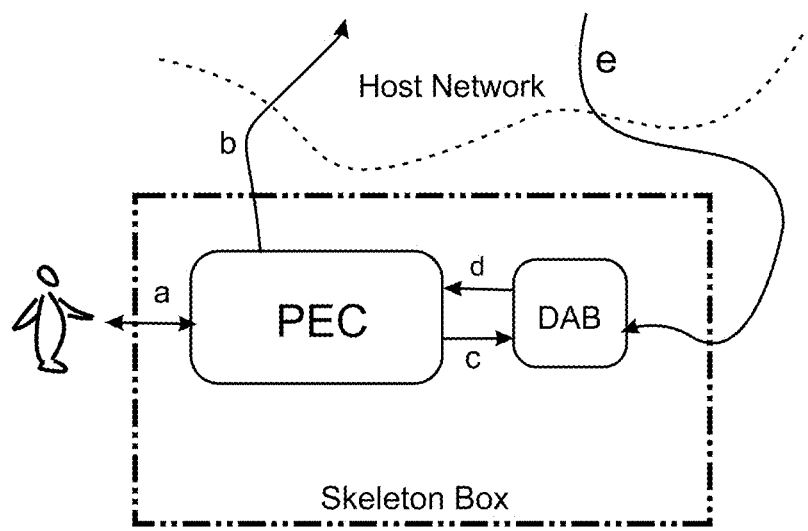

FIG. 8: Skeleton Box Configuration Nominal

This figure shows the skeleton box containing the PEC (physical entry computer), and the DAB (data access box). It shows the operator communicating with the PEC (a), and the PEC sending information to the host network (b). This is a one-way communication, no data flows in reverse. Line (c) shows the communication from the PEC to the DAB. This line contains plaintext material to be encrypted in the DAB, and returned to the PEC through line (d) as a ciphertext. The PEC will pack the ciphertext with instructions for the host network where to deliver this ciphertext to (to another skeleton box—the only ones to be able to decrypt that ciphertext). This pack goes through line (b). Line (e) shows the flow of encrypted messages from another skeleton box coming into the DAB. There it is decrypted and sent to the PEC (d). Anything that is not properly encrypted (in another skeleton box) will decrypt into "garbage"—including any malware that infiltrates to the host network.

Figure 9:
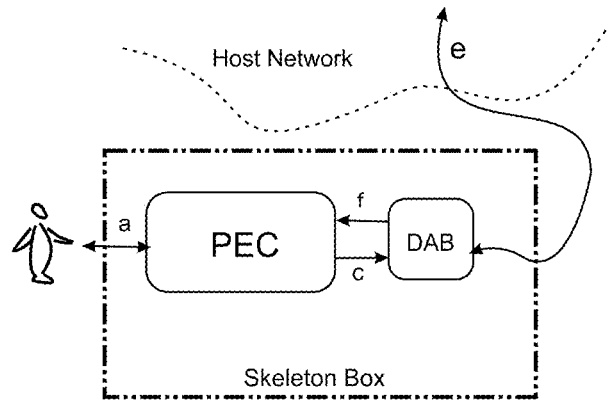

FIG. 9: Skeleton Box Configuration—DAB Routing Option

This figure depicts the option where all the communication between the skeleton station and the host network are carried out through the DAB. All the information prepared by the PEC for the network, is going through the DAB, which will distinguish between it, and information that must be encrypted and packed with routing data for its destination. All network traffic will be filtered (decrypted) by the DAB before its reaches the PEC.

Figure 10:
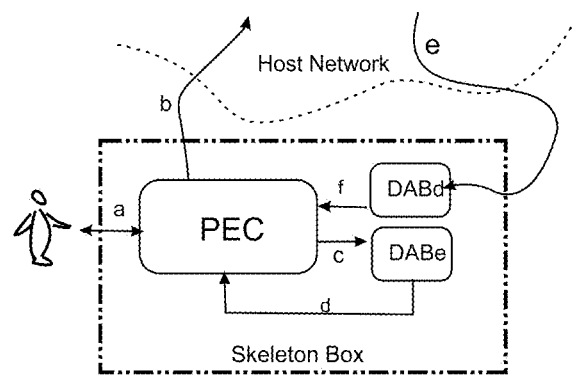

FIG. 10 Skeleton Box Configuration—Two DABs Option

The figure shows the configuration where there are two DABs (data access boxes), one for encryption, and one for decryption. When the operator wishes to send message to another skeleton box, it sends this message (plaintext) to the encryption DAB (DABe), (c), and DABe then sends back (d) the corresponding ciphertext, which then the PEC packs with routing data and releases to the network (b) so the network knows where to deliver the skeleton encrypted message. Line (e) represents message sent from other skeleton boxes to this box, through the decryption DAB (DABd).

Figure 11:
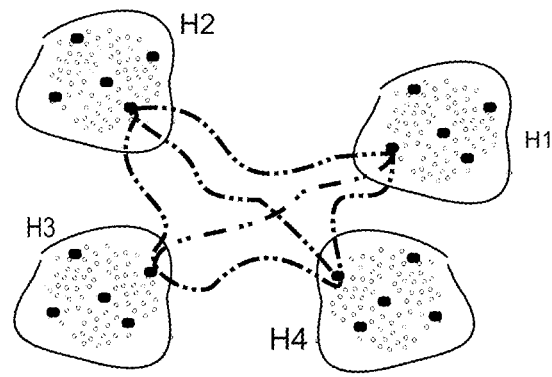

FIG. 11 Bridged Skeleton Network

The figure shows four systems of host networks, each is anchored on a respective skeleton network. Each skeleton network designates one skeleton box as the bridge connection box. The figure shows how all the bridge connection boxes are connected (bridged) with each other.

Figure 12:
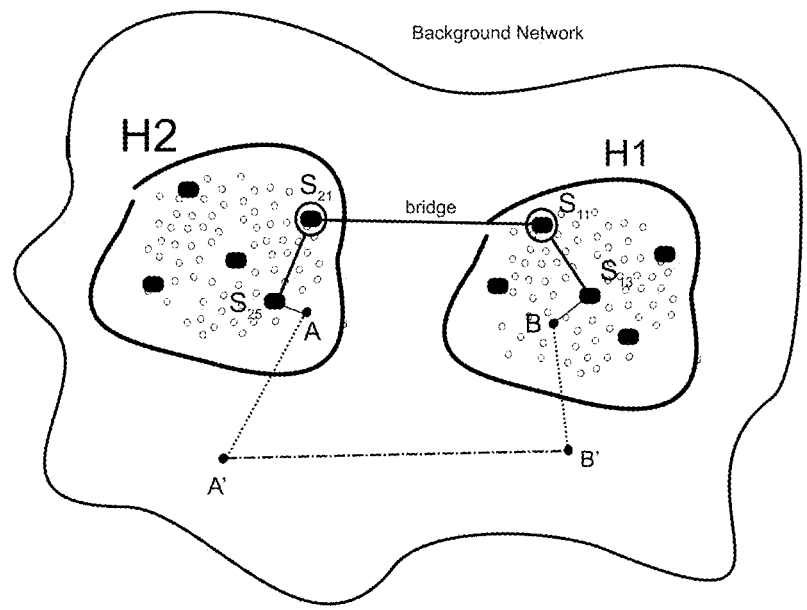

FIG. 12 Bridge-Based Cross Network Communication

The figure shows the encompassing background network in which two distinct host networks are identified: H1, H2. Each host network is fitted with a skeleton network. Each skeleton network has designated a skeleton station to be the bridge station: H11, H21. The figure depicts node A in H2 wishing to communicate with node B in H1. Node A then communicates with its neighborhood skeleton station, S25. S25 will then issue a secret key k for A (possibly offline). S25 will then securely communicate k to S21, the bridge station. S21 will then pass k to the opposite bridge station in H1: S11, S11 will then identify the local skeleton station for node B (in H1), and securely communicate k to it (S13). Skeleton Station S13 will then communicate k to B (possibly off-line). At this stage both A and B have a hold of the same key, k. But since they are registered in two different hosting networks and have no direct communication channel, they both generate a "mirror" node in the background network they both share, and these mirror nodes A' and B' communicate using the shared key k. If the cipher A and B are using does not use a ciphertext that commits to the plaintext then the communication A'B' is immunized to communication cryptanalysis because A' and B' don't have knowledge of the key k. Only A and B know the identity of k and based on this they communicate the message to their respective mirrors. We note that A and B may have been stranger to each other, before, during and after the communication between them based on key k. It is the bridge configuration that enabled them to communicate securely while remaining strangers. They may only identify themselves as the "other party in possession of the special communication key, k". So while in practice A and B may know certain things about eaach other, they can communicate securely without any such familiarity.

Figure 13:
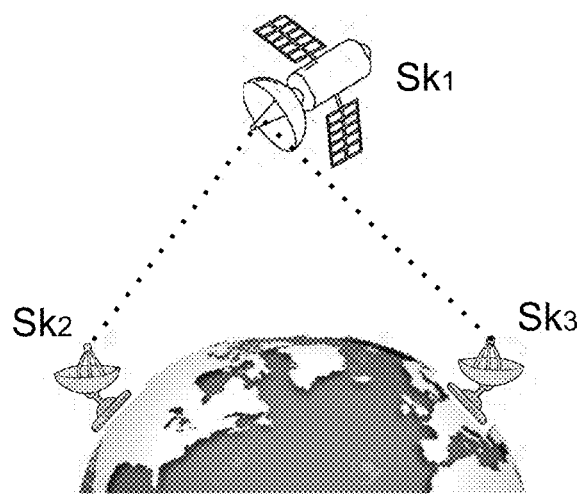

FIG. 13: Satellite Based Skeleton Network

The figure shows three skeleton stations, where one is a communication satellite directly communicating with two earth bound stations. The communication is mathematically secure as long as the quantity of data traffic is less than the size of the shared key, which cannot be compromised remotely.

Figure 14:
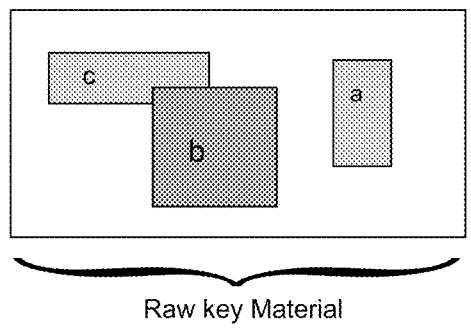

FIG. 14 Raw K Material

Figure 15:
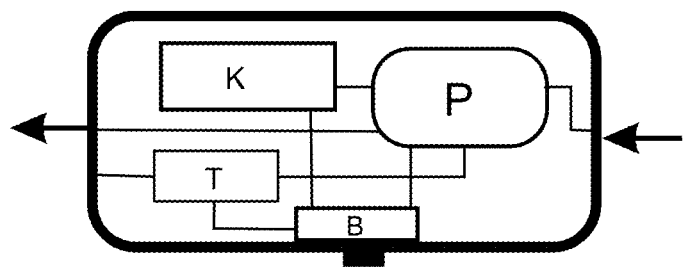

This figure shows a large rectangle that represent a matrix of random bits. This is the key material secured in the skeleton box. The software and the processor in the box will identify 'slices' of this matrix to be served as a cryptographic key for a particular round of data processing. Such slices are marked, a, b, and c, FIG. 15 Elements of a Skeleton Box The figure shows the secure enclosure with one entry port and one egress port. It also shows, at the bottom, a battery charging port fitted to the battery, B, which is shown to power up the processing until P and the key material, K. The battery is controlled by the tamper-resistance apparatus, T, that is linked both to the battery and to the processor to activate erasure of the key material upon detection of an attempt to tamper with the box. The processor is shown to get the input flow, connect to the key material and generate the output flow.

Figure 16:
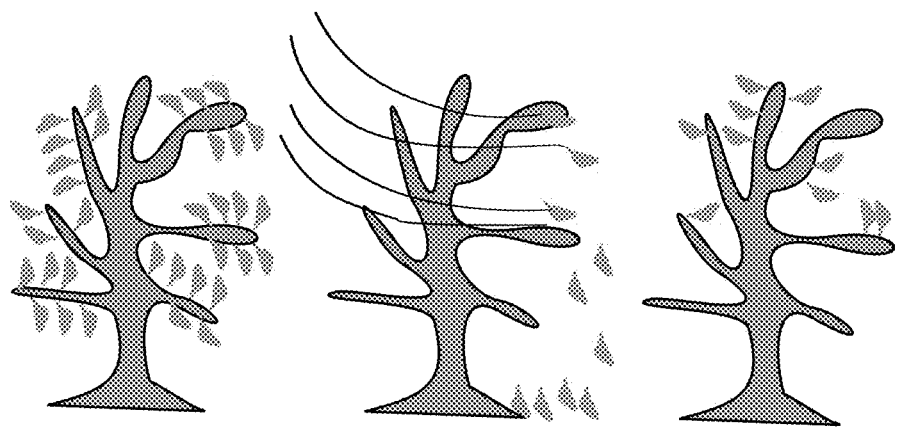

FIG. 16: Skeleton Recovery Illustration

The figure shows the skeleton recovery concept. On the right a blooming tree where the leaves represent the regular host network nodes, while the branches represent the skeleton network. In the middle the figure shows a data breach that infects the host network, represented by a wind that blows off the leaves. The branches (the skeleton network) is left unharmed. The right side tree shows how a new "bloom"—recovered host network—is growing on the basis of the skeleton.

Figure 17:
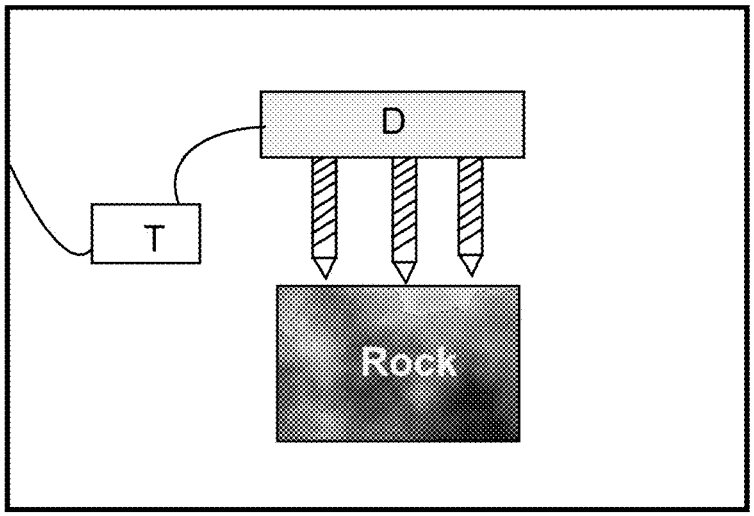

FIG. 17 Rock Destruction Mechanism

The figure shows a secure enclosure housing a 'rock of randomness' (the "rock"). It shows an "assault monitor" box, "J" that is designed to detect any attempt to compromise the integrity of the enclosure. Once an assault is detected the monitor activates a battery operated rock destruction unit, "D", which operates in this case three drills that bore holes in the rock to erase parts of the chemical structure of the rock and thereby distort its reading and functionality.

Figure 18:
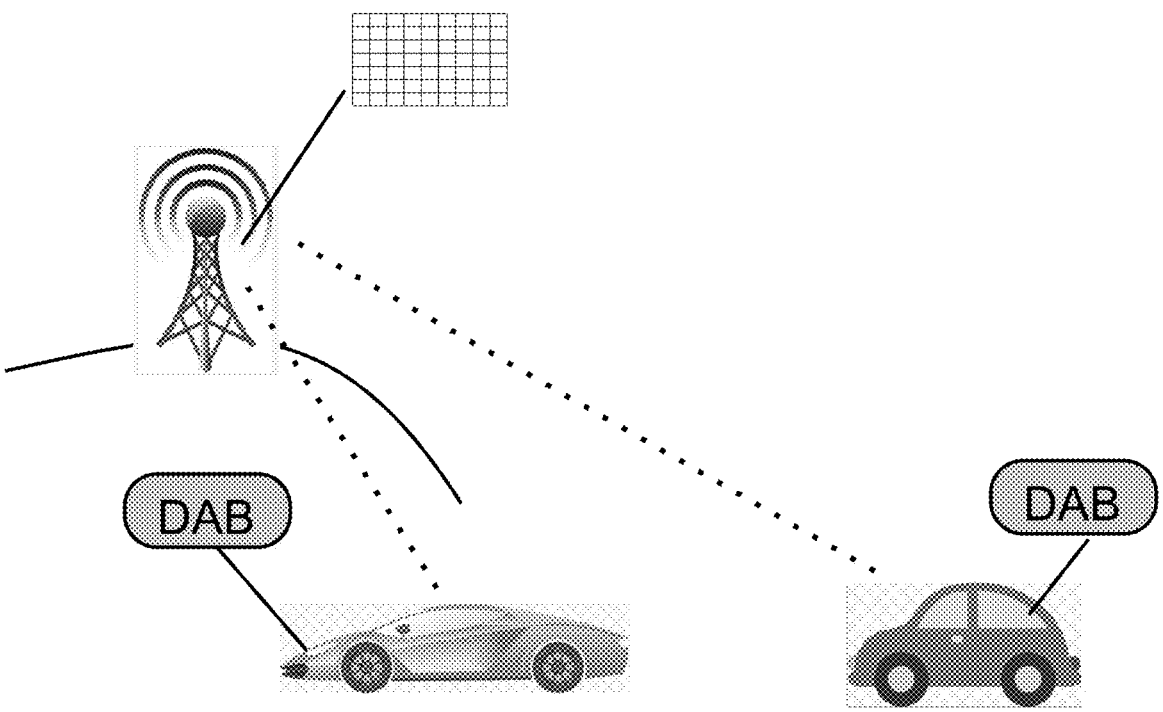

FIG. 18: DABs in the Cars, not in the Control Center

This figure depicts "half way DAB implementation" where the cars on the road are equipped with a DAB to meet tampering challenge, but the key kept in each DAB is kept in a nominal database mode in the automotive control center, which relies on its strong cyber security perimeter, to fend off attackers. It is an important convenience and efficiency advantage for the control center handling a large number of cars to keep the communication keys in a more accessible format. Note that automotive skeleton stations may take in local sensory information to send to the control center.

Figure 19:
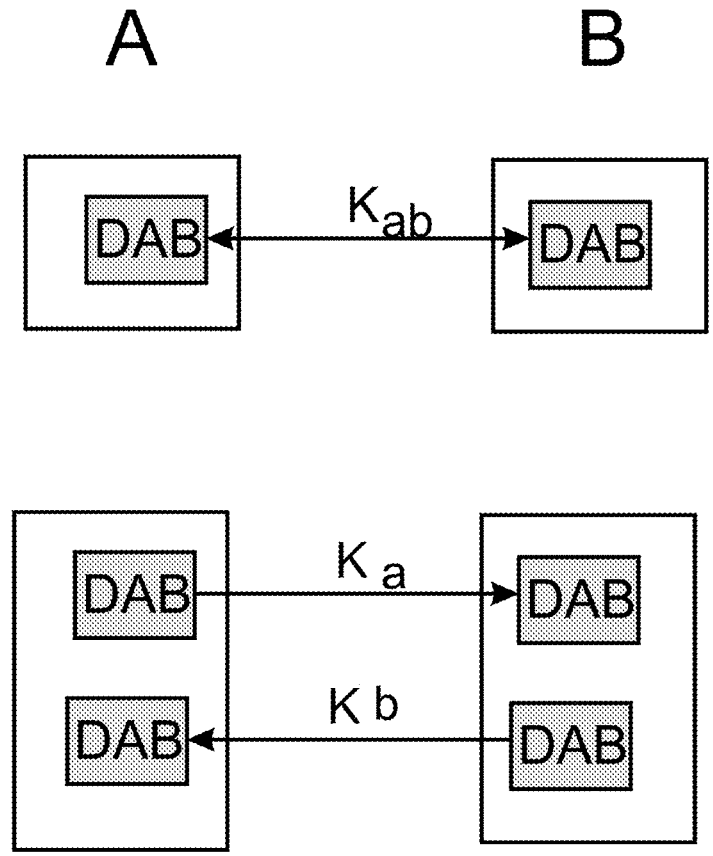

FIG. 19 One Way DAB v. Two DAB v. Two Way DAB

Figure 20:
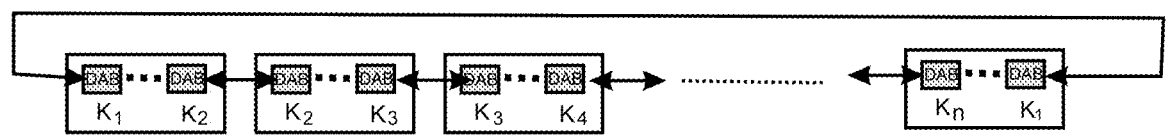

The figure shows a network of two nodes. In the upper section, the two nodes A and B share a single key, $K_{ab}$, with which they communicate as a skeleton network. At the bottom part A and B use two keys, $K_a$ which A is using to encrypt messages for B, and B uses it to decrypt these messages; and $K_b$ which B uses to encrypt messages to A and A uses to decrypt them. All four DABs in this option are one-way. They are built hardware wise to either encrypt or decrypt FIG. 20: Chain of DABS This figure shows a skeleton network comprised of a chain of n skeleton stations. Each station is fitted with two DABs, one that includes a key shared by the station positioned before the current station, and one DAB including a key shared by the next station relative to the current one. The messages decrypted from either key are put in common regard within the skeleton station. The last station routes back to the first station. This creates a circle option where any message may originate at any station out of the chain of n, and be directed to any other of the (n−1) stations, by using the services of the skeleton stations which are leading from the message originator to the intended message recipient.

Figure 21:
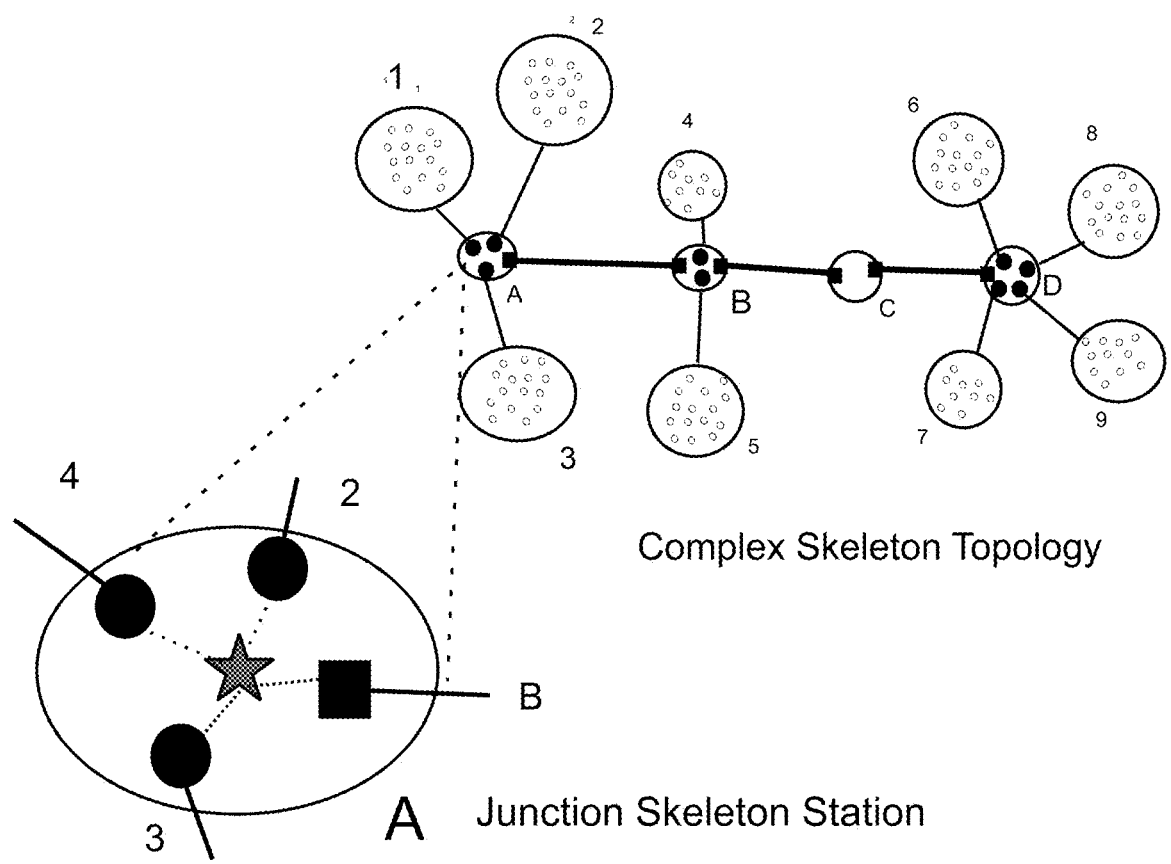

FIG. 21: Complex Skeleton Topologies, Juncture Skeleton Station

This figure shows a complex topology. A main line skeleton network comprised of nodes A, B, C, and D is connected linearly through DABs marked as a black square within these nodes. Skeleton station A contains such a square marked DAB with skeleton station B. It also contains DABs (and respective keys) which make it a node in three independent skeleton networks, marked as networks 1, 2, and 3. Skeleton station B has two square marked DABs one for connection with station A and the other for connection with station C. Station B also has two additional DABs to be part of networks 4 and 5. Skeleton station C has only square marked DABs to connect with station B and D. Station D has a single square marked DAB to connect with station C and three additional DABs to connect with networks 6, 7, 8 and 9. Station A is shown at the left bottom of the figure in larger size. The four DABs are shown along with the PEC (marked as a red star) where all the messages from all DABs may be mutually regarded.

TABLE OF CONTENTS

Skeleton System Components . . . 4
  The Physical Entry Computing Device (PEC) . . . 4
  The Data Access Box . . . 5
    DAB Technology . . . 6
    Mathematical Security . . . 7

Vernam Security . . . 8
  Trans-Vernam Ciphers . . . 10
    Examples of Trans-Vernam Cipher . . . 11
  Key Elimination Technology . . . 11
  DAB Components . . . 12
  Alternative System Construction . . . 13
Skeleton Network Methodology . . . 14
  Priming . . . 15
    Design . . . 15
      Construction of the Skeleton Boxes . . . 16
      Charting Off-Line Communication Zones . . . 16
      Installing the skeleton Network . . . 16
    Nominal Operation . . . 17
      Independent Skeleton Only Communication . . . 17
      Host-Support Communication . . . 18
      Concealment of Pattern . . . 18
    Recovery Operation . . . 19
    Closing Down . . . 20
    Bridged Skeleton Networks . . . 20
Skeleton Network Implementation . . . 22
  Stand-Alone Skeleton Implementation . . . 23
  Host-to-Skeleton Implementation . . . 23
  Skeleton to Host Implementation . . . 23
  Super Host Implementation . . . 24
  Skeleton Administration Post . . . 24
  Asymmetric Implementation . . . 24
    Partial DAB Implementation . . . 25
    One-Way Skeleton Station . . . 26
    Two Dab Stations . . . 26
  BitLoop . . . 27
  Topologies . . . 28
  Proactive DAB Destruction . . . 29
  Local Monitor Skeleton implementation . . . 29
  "Rock" Skeleton . . . 29
Security . . . 30
  Security Grading . . . 32
  Untrustworthy Insider Protection . . . 32
Summary of the Essential Aspect of the Skeleton Network—
  System and Operation . . . 33
Explanation of Drawings . . . 36

What is claimed is:

1. A system utilizing a secure enclosure to achieve network security comprising:

a skeleton network comprising at least one or more skeleton stations;

each of the at least one or more skeleton stations comprising a physical-entry computer (PEC) and a data access box (DAB);

the DAB configured to be a physically and/or electronically and/or cryptanalytically secure enclosure comprising a hardware computer processor and memory, with a shared cryptographic key that is shared between two or more of the at least one or more skeleton stations provided that there are at least two or more of the at least one or more skeleton stations, this shared cryptographic key residing in the DAB that is inaccessible to any entity outside the DAB secure enclosure, this shared cryptographic key utilized by the DAB to decrypt inbound encrypted data and encrypt outbound plaintext data;

the PEC configured to be a physical and local data entry computing device comprising a hardware computer processor and memory, the PEC having no communication connections external to the skeleton station except for a data transmit one-way directional outbound communications line to an external additional skeleton station or external host network, and also except for a communications connection external to the skeleton station necessary for physical and local data entry, and that except for physical and local data entry, the PEC accepts no entry of any data except for data directly received from the DAB; and the skeleton station configured to route all received external or remote inbound data through the DAB where it is decrypted using the shared cryptographic key before being routed to the PEC, with the PEC receiving decrypted external or remote inbound data directly from the DAB, and when the PEC has outbound data to transmit to an external additional skeleton station or to the external host network, the PEC passes the outbound data in plaintext form to the DAB, the DAB then encrypts this outbound plaintext data using the shared cryptographic key, and passes the outbound data in encrypted form back to the PEC, of which the PEC then transmits the DAB encrypted outbound data via the PEC's data transmit one-way directional outbound communications line to an external additional skeleton station or to the external host network.

2. The system of claim 1, further comprising:

wherein the encryption/decryption processes in the DAB utilize a cipher with specific characteristics, the specific characteristics of the cipher used in the DAB being that the size of a key utilized by the cipher may be set to be as large as desired, and as long as a total bit count of all transmitted and received data messages processed in the DAB is equal to or less than a total number of bits in the shared cryptographic key in the DAB, then no amount of available plaintext-ciphertext pairs is sufficient to deduce the identity of the shared cryptographic key, as for example is the case for a Vernam, BitFlip, and SpaceFlip Cipher; and wherein the DAB includes a data use monitor that counts the number of bits processed by the DAB, and when the total number of bits processed by the DAB reaches the total number of bits of the shared cryptographic key in the DAB, a key-erasure apparatus in the DAB is activated, and the shared cryptographic key in the DAB is erased by the DAB's key-erasure apparatus.

3. The system of claim 1, further comprising:

wherein at least one or more of the skeleton stations are host network nodes within the external host network, the external host network providing network communications paths to interconnect the at least one or more skeleton stations, and where the host network nodes of the external host network which are not also skeleton stations can receive data messages or information transmitted from the at least one or more skeleton stations but cannot transmit data messages or information to the at least one or more skeleton stations.

4. The system of claim 1, further comprising:

wherein at least one or more network nodes are formed by the joining of one of the at least one or more skeleton stations with a computing device that resides at a non-skeleton network node, with the resulting network node configured to be a skeleton administration post managed by a human controller, the human controller utilizing a physical connection at the skeleton administration post to pass information to and from the PEC.

5. The system of claim 1, further comprising:

wherein the DAB in at least one or more of the skeleton stations is configured to either only encrypt outbound plaintext data or only decrypt inbound encrypted data.

6. The system of claim 1, further comprising:
wherein at least one or more of the skeleton stations is configured to either only encrypt outbound plaintext data to transmit to an external additional skeleton station or only decrypt inbound encrypted data received from an external additional skeleton station.

7. The system of claim 1, further comprising:
wherein at least one or more of the skeleton stations is configured to communicate over exposed channels while preventing a remote attacker from compromising the communication over the exposed channels by:
using shared cryptographic keys which are each secured in each respective skeleton station's DAB secure enclosure, and where the respective shared cryptographic key of each respective skeleton station's DAB secure enclosure is erased when the respective shared cryptographic key is utilized to process data of a total bit count larger than the total bit count of the respective shared cryptographic key.

8. The system of claim 1, further comprising:
wherein the external host network is divided into "offline communication zones" (OCZ), indicating that each non-skeleton network node in the external host network is physically close enough to configure an offline shared cryptographic key with a skeleton station.

* * * * *